United States Patent

[11] 3,618,024

[72] Inventors Marc Jean Pierre Leger
Issy-Les-Moulineax;
Claude Paul Henri Le Rouge, Maurepas
Trappes; Jacques Henri De Jean, Ris-
Orangis, all of France
[21] Appl. No. 788,114
[22] Filed Dec. 5, 1968
[45] Patented Nov. 2, 1971
[73] Assignee International Standard Electric Corporation
New York, N.Y.
[32] Priority Dec. 12, 1967
[33] France
[31] 131,905

[54] ELECTRONIC MULTISELECTOR
3 Claims, 5 Drawing Figs.

[52] U.S. Cl. .................... 340/166 R, 179/18 GF
[51] Int. Cl. .................... H04q 3/00
[50] Field of Search .................... 340/166 R; 179/18.7 YA

[56] References Cited
UNITED STATES PATENTS

| | | | |
|---|---|---|---|
| 2,844,812 | 7/1958 | Auerback | 340/166 R |
| 3,218,613 | 11/1965 | Gribble | 340/166 X |
| 3,395,247 | 7/1968 | Fieldgate | 340/166 X |
| 3,493,932 | 2/1970 | Yu | 340/166 |

*Primary Examiner*—Ralph D. Blakeslee
*Attorneys*—C. Cornell Remsen, Jr., Walter J. Baum, Percy P. Lantzy, J. Warren Whitesel, Delbert P. Warner and James B. Raden

ABSTRACT: A switching matrix includes horizontal and vertical multiples having MOS field effect transistor cross-points. A bistable circuit at the cross-point remembers the busy or idle state of the cross-point. The cross-point is particularly well adapted for integrated or monolithic devices.

ELECTRONIC MULTISELECTOR

The present invention concerns a multiselector for a switching stage wherein the contacts placed at the cross-points are materialized by MOS field effect transistors and wherein the latching of said contacts is effected by electronic means.

A crossbar multiselector designed to transmit data on $p$ conductors comprises $m$ vertical selection bars and $n$ horizontal selection bars which define $m \cdot n$ cross-points. A pile-up of $p$ contact pairs is associated to each cross-point so that the contacts close when the vertical and the horizontal bar defining this point are successively energized and that they remain closed when the horizontal bar is deenergized.

As the operation of each of these bars is controlled by a selection electromagnet, the latching of the contact is ensured by the electrical latching of the vertical selection electromagnet.

A multiselector according to the invention, the cross-points of which are equipped with active components such as MOS field-effect transistors, is arranged in the same way although it has no mechanical components, and each cross-point is equipped with two transistors, one for each transmission direction, i.e. $p=2$.

The horizontal bar and the vertical bar are also selected successively but locking is effected electronically by means of a flip-flop.

The use of electronic circuits as cross-point components has many advantages, one of the main ones being that the control power required is very low and of the same order of magnitude than that of the signals used in a centralized electronic control unit and of the data signals. Moreover much greater switching speeds are achieved thanks to the elimination of all mechanical components.

Nevertheless the adoption of bipolar transistors or other conventional solid state devices is not entirely satisfactory especially since none of these circuits offer properties close enough to those of electromechanical contacts which are first a very high ratio between the resistance in the open state and the resistance in the closed state and, second, near perfect insulation between the control circuit and the switched circuit.

On the other hand MOS-FET transistors such as described in particular in an article entitled "Open the gate to nanopower IC logic" published in the Sept. issue (Sept. 13, 1967) of "Electronic Design" (pages to ) do not present these disadvantages. Indeed, the drain-to-source resistance of a MOS-FET, which constitutes the switched circuit, is controlled by the gate voltage with an almost perfect insulation between the control circuit and the output circuit and it presents a resistance exceeding $10^7$ ohms when blocked and a resistance comprised between 100 and 300 ohms in its low impedance conduction state, thus ensuring proper operation provided some precautions are taken. Moreover, circuits using MOS transistors can be made in LSI (large scale integration) circuits comprising several hundred active components.

The object of the present invention, then, is to realize an electronic multiselector.

The invention is characterized by the fact that the switching component which serves as a contact placed at each cross-point between a vertical and a horizontal conductor is a MOS-FET transistor and that the gate of said transistor is connected to a holding bistable which, when in the 1 state, controls the setting of the transistor in its conducting state which corresponds to the closing of the contact.

Another feature of the invention lies in the fact that a multiselector matrix comprises $m$ vertical bars and $n$ horizontal bars to which the same number of selection conductors are associated, that the selection of a vertical bar $j$ is carried out by applying a signal $Cj$ to the associated conductor, that the selection of a horizontal bar is carried out by applying a signal $Sk$ to the associated conductor, that the matrix moreover comprises $n$ line conductors associated to the horizontal bars, a signal $\overline{Ek}$ appearing on the conductor associated to the horizontal bar $k$ when at least one cross-point is closed on said horizontal bar, that, in the rest state, signals $\overline{Cj}$ and $\overline{Sk}$ are applied to the selection inputs so that the state of the latching bistable remains unchanged and that a delay circuit to which signal $Cj$ is applied delivers a signal $C'$ which is delayed for a duration $t$ slightly greater than the switching time of the latching bistable.

Another feature of the invention lies in the fact that, to control the closing of a cross-point, first horizontal selection of the said point is effected by applying the signal $Sk$, second vertical selection of said point is effected by applying signal $Cj$ which releases all the cross-points associated to the vertical bar by resetting their holding bistables in the 0 state, third signal $Cj$ is suppressed, and signal $C'j$ ensures the setting in the 1 state of the latching bistable of the cross-point selected if a signal $Ek$ is present, and, fourth signal S is suppressed and the cross-point receives signals $\overline{Cj}$ and $\overline{Sk}$ which maintain it in the rest state.

The above mentioned and other features and objects of this invention will become apparent by reference to the following description taken in conjunction with the accompanying drawings in which.

Figure 1:
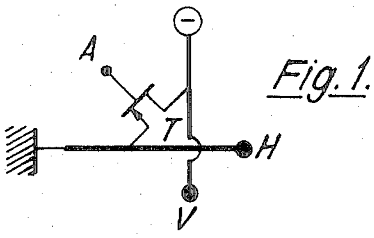
FIG. 1 shows a simplified diagram of a switching component associated to a cross-point.

FIG. 1 provides a simplified diagram of a cross-point between conductors V and H. These two conductors are connected to the source and to the drain of a $Ph$ type MOS transistor (P-type, Enhancement mode MOS transistor) the control electrode or gate of which receives signal A.

It will be recalled that MOS transistors are almost perfectly symmetrical and that the electrodes which serve as the drain and the source can be interchanged without modifying the operation when used in a logic circuit. Nevertheless, the manufacturer defines, as one of its characteristics, the electrodes which act as the source and as the drain. This is why the source is represented by an arrow in the figures in the same way as the emitter of a bipolar transistor.

In describing the operation of a MOS transistor the following voltages are used:

VT: threshold voltage

VD: drain voltage

VG: gate voltage.

All these voltages being measured with reference to the source voltage taken as $VS=0$ and expressed in absolute values, MOS transistor is blocked when $VG \leq VT$. It then offers a drain-to-source resistance RDS of almost infinite value (approximately $10^7$ ohms).

A MOS transistor is conducting when $VG>VT$. It then operates like a passive resistor of value $$RDS=\frac{1}{-K(VG-VT)}$$

K being a proportionality factor.

In this case two conduction regions can be distinguished:

The low impedance conduction region when $VD<VG-VT$ in which the drain-to-source resistance RDS presents a low value (50 to 300 ohms). The high impedance conduction region when $VD \geq VG-VT$ with a relatively high value of the resistance RDS.

In the present invention, the MOS-Ph transistors are used as logic devices by applying voltages to them such that they are either blocked or in the low impedance conduction state. In the course of the description, a transistor in this latter state will be said to be conducting.

If the transistor 1 shown in FIG. 1 has a threshold voltage $VT=-4$ volts and if a voltage $VG=-24V$ and a voltage VD comprised between 0 and −20 volts are applied to it, it then passes to the state which has just been defined as the conducting state. In practice, if one wishes to obtain a good linearity of the resistance RDS, one must apply lower of VD.

The resistor RDS presents then its minimum value and the transistor assures the bidirectional flow of analog or digital signals between conductors H and V.

Figure 2:
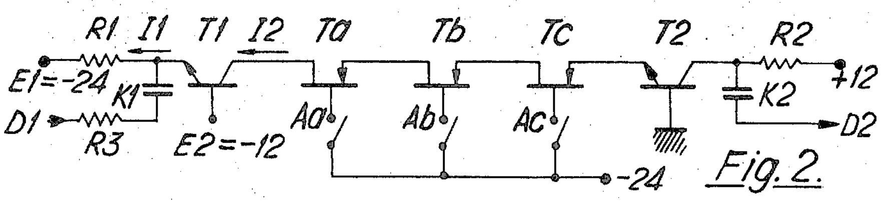
FIG. 2 shows a first connection method in an exchange comprising several selection stages.

FIG. 2 shows the path established via several transistors of this type connected in series for data transmission in an exchange comprising, by way of example, three switching stages *a*, *b*, and *c*.

In each of these stages said path passes through a MOS-Ph transistor T*a*, T*b*, and T*c* in addition to NPN bipolar transistors T1 and T2 located at each end of the path. Control signals A*a*, A*b*, and A*c* are applied to the MOS transistors via switches having the same references. The signals to be transmitted are applied to input D1 and are seized at output D2; the coupling being carried out via capacitors K1 and K2.

The DC operation of this circuit will be examined assuming that switches A*a*, A*b* and A*c* are closed.

Transistor T1 is then conducting with a collector current $$I_1 \simeq \frac{E1-E2}{R1}$$

and there is a difference of potential of 24 volts between the gate of transistor T*c* and the base of transistor T2 through the high impedance constituted by the interelectrode capacity and the leakage resistance of transistor T*c*. The latter thus becomes conducting and controls the saturation of T2. Similarly, transistors T*b* and T*a* become conducting with a current I2 ≅ I1 flowing through them; the load resistance of transistor T1 then having a value of R2+3RDS.

For AC operation, transistors T1 and T2 are in common base configuration with a very low input impedance (approximately 10 ohms) and a very high output impedance (approximately 1 megohm). If $\alpha 1$ and $\alpha 2$ design the current gains of these two transistors, and $i1$and $i2$the input and output AC currents, thus: $i2 = \alpha 1 \cdot \alpha 2 \cdot i1$. It thus can be seen that if, bipolar transistors with a high gain are used, the output currently only differs by a few percent from input current and that it is independent from the resistance constituted by the saturation resistances of the MOS transistors T*a*, T*b* and T*c* in series connection. As transistor T1 has a very low input impedance, the input current *i*1 depends entirely on the value of resistor R3 which comprises the line impedance. At the output, the load impedance is connected in parallel on resistor R2 and the current *i*2 is shared by these two components according to their respective values.

The circuit which has just been described allows for transmitting data in one direction, from D1 to D2, owing to the fact that the reverse voltage transfer ratio *h*12 of the bipolar transistors T1 and T2 is very low. To achieve bidirectional transmission, two identical chains must be used with two-wire four-wire transfers.

Figure 3:
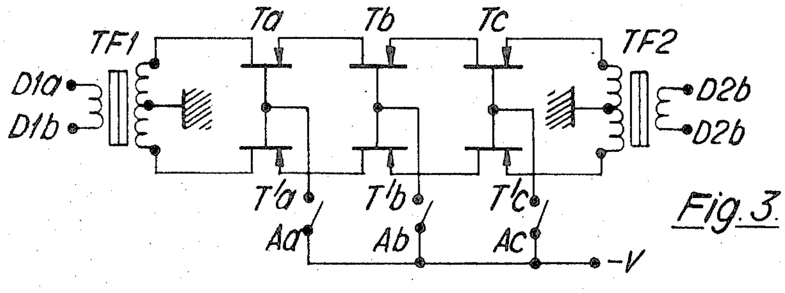
FIG. 3 shows a second connection method in an exchange of the same type.

FIG. 3 shows a two-wire circuit which ensures bidirectional data transfer between terminals D1*a*–D1*b* and D2*a*–D2*b* since it only comprises MOS transistors. It is identical to the circuit in FIG. 2 with the exception that speech signals are applied via transformers T1 and T2. The signals in the two chains of MOS transistors T*a*, T*b*, T*c* and T'*a*, T'*b*, and T'*c* are in phase opposition thus achieving symmetrical transmission which reduces crosstalk.

Figure 4:
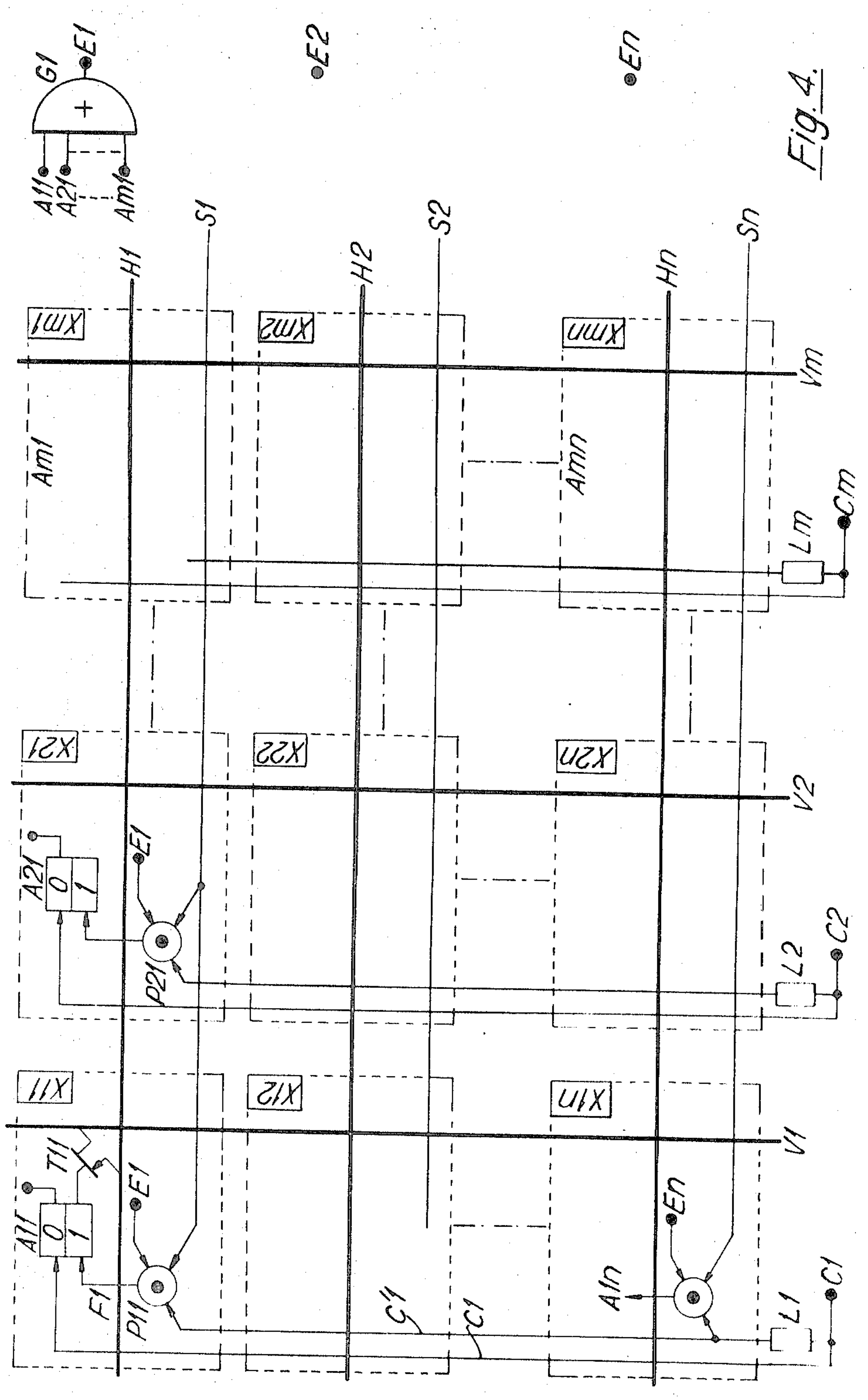
FIG. 4 shows a diagram of a multiselector matrix.

FIG. 4 shows a schematical diagram of one of the two matrices of the multiselector according to the invention in which the conductors which are connected via cross-point elements bear the references V1, Vz...V*m* in the case of the vertical ones and H1, H2... H*n* in the case of the horizontal ones.

Each cross-point circuit such as that bearing reference X11 at the top left-hand side of the figure comprises a MOS-Ph transistor T11, a control gate P11 and a holding flip-flop A11. Table I, below, shows voltage levels at both the outputs of the flip-flop All.

TABLE I

| Flip-flop state | Crosspoint state | Voltage levels 1 output | 0 output |
|---|---|---|---|
| 1 state | Closed | −V | 0 |
| 0 state | Open | 0 | −V |

For simplification purposes only the components of circuit X11 have been completely represented; all the others being identical to circuit X11. It will be noted that, where references comprise two figures the first stands for the vertical and the second for the horizontal.

The selection conductors associated to the verticals and to the horizontals are referenced C1, C2...C*m* in the case of the vertical selection and S1, S2...S*m* in the case of the horizontal selection.

Each vertical selection conductor, such as conductor C1, receives a connection signal bearing the same reference C1 which controls the resetting in the 0 state of the *n* flip-flops A11...A1*n* associated to the vertical V1. The same signal, delayed by circuit L1 and referenced C'1, is applied to one of the control inputs of gates P11...P1*n* associated to that vertical. Every one of these gates, gate P1l for instance, comprises 2 additional inputs, the first of which is connected to the horizontal selection conductor S1 to which a selection signal S1 can be applied and the second of which is connected to a line conductor E1 to which a free line signal E1 can be applied. This signal is delivered by a NOR circuit G1 comprising m inputs connected to the *m* 0 outputs of the flip-flops A11 to Aml so that, when the horizontal Hl is completely free (0 level on all the inputs of G1), a signal E1 of amplitude −V is obtained and that, as soon as a cross-point closes, a busy signal E of 0 amplitude is obtained.

The AND circuit Pll delivers a signal Fl of 0 volt amplitude to the 1 input of the flip-flop All when a connection signal C1, a selection signal S1 and a free line signal E1—all these signals having an amplitude −V—are received simultaneously.

Figure 5:
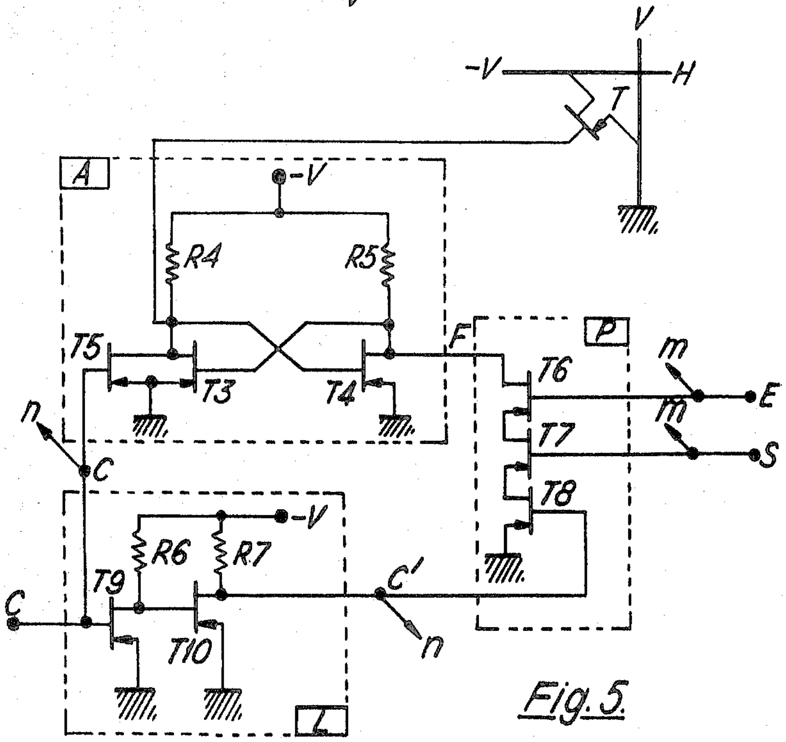
FIG. 5 shows a detailed diagram of the circuits associated to a cross-point.

FIG. 5 shows a detailed diagram of the cross-point with the MOS-Ph transistor T, the flip-flop A, the gate P and the delay circuit L. Flip-flop A comprises MOS-Ph transistors T3, T4, T5 and resistors R4 and R5. Its operation is similar to that of a flip-flop equipped with PNP bipolar transistors and will not be described in detail herein. The flip-flop will be said to be in the 0 state when transistor T4 is blocked (T3 conducting) and in the 1 state when transistor T3 is blocked (T4 conducting).

Flip-flop resetting is obtained by applying to the grid of transistor T5 a voltage −V which controls the setting in the conduction state of T5 and T3 so that T4 is blocked. The flip-flop is set in the 1 state by grounding the drain of transistor T4 via the AND circuit P.

The latter comprises 3 MOS-Ph transistors T6, T7 and T8 which are conducting for the logic condition $F = C' \times S \times E$ which controls the grounding of the drain of transistor T4.

Finally, the delay circuit L comprises the MOS-Ph transistors T9 and T10. It delivers, on the drain of transistor T10, a signal C' the rise and the fall times of which are slightly delayed by a time *t* with respect to the rise and fall times of signal C, this delay being due to the switching time of transistors T9 and T10.

It will be noted that, in the case of integrated circuits, the resistors R4 to R7 are composed of MOS-Ph transistors the gates of which are connected to the drain so that all the circuits which make up the matrix of the multiselector have but a single type of component.

The method of operation of the multiselector will now be described. Table II below shows the voltage values corresponding to signals C, D, E, S and to their complements.

TABLE II

| Signal | Crosspoint state | Voltage |
|---|---|---|
| $\overline{C}$, $\overline{C}'$ | Rest | 0 |
| C, C' | Vertical selection | −V |
| $\overline{S}$ | Rest | 0 |
| S | Horizontal selection | −V |
| $\overline{E}$ | Horizontal busy | 0 |
| E | Horizontal free | −V |

In the rest state, i.e. no operation is performed on the cross-point, signals $\overline{C}$ and $\overline{S}$ are applied to the selection inputs as well as one of the signals $\overline{E}$ or E. Signal $\overline{C}$ controls the blocking of the control transistor T5 of flip-flop A and signal $\overline{S}$ controls the blocking of the gate P thus maintaining the state of the flip-flop.

The simultaneous application of signals C and $\overline{S}$ controls the opening of the cross-point. Signal C renders the transistor T5 conducting thus resetting flip-flop A in the 0 state, the gate P remaining blocked by the signal $\overline{S}$. It will be noted that, if the signal S is applied at a time when transistor T5 is receiving a signal $\overline{C}$, the gate P remains blocked by the signal $\overline{C'}$ and that the flip-flop A cannot switch, regardless of the voltage on the line conductor (signal E or $\overline{E}$).

In the operation method which will now be described by way of example, which in no way limits the scope of the invention, the opening of a cross-point which is no longer used to transmit a call is only effected when another cross-point associated to the same vertical must be closed in order to establish a new path. The following operations are then effected successively:

1. Horizontal selection of the cross-point by applying a signal S. The flip-flop A remains in its state.

2. Vertical selection of the cross-point by applying a signal C. This signal controls the opening of all the nonselected cross-points associated to the vertical since these cross-points receive simultaneously signals C and S.

Moreover, when the selected line is free, i.e., when a free line signal E is present, the transistor T5 and the gate P of the selected cross-point are conducting so that the drains of both transistors T3 and T4 are grounded and that the transistor T remains blocked.

3. Latching: when the signal C is suppressed (condition $\overline{C}$), the transistor T5 blocks and the flip-flop sets in the 1 state controlling the setting in a conducting state of transistor T. This setting, which corresponds to the locking of the contact in closed position, can be carried out without any risk of error since signal C' which is applied at gate P for a duration *t* after the suppression of signal C, maintains transistor T4 in a conducting state long enough to ensure the flip-flop switching.

4. Suppression of the signal S (condition $\overline{S}$). The flip-flop remains in the 1 state and the cross-point which receives signals $\overline{C}$ and $\overline{S}$ is then in the rest state previously defined.

While the principles of the above invention have been described in connection with specific embodiments and particular modifications thereof it is to be clearly understood that this description is made by way of example and not as a limitation of the scope of the invention.

In particular, transistors of opposite polarity can be used by inverting the supply source polarities.

SUMMARY

Electronic switching element equipped with MOS transistors and multiselector incorporating said elements characterized as follows:

1. Each switching element comprises a MOS transistor the gate of which is connected to the 1 output of a holding flip-flop. The resetting in the 0 state of this flip-flop is controlled by applying a connection signal C over its 0 input and its setting in the 1 state is controlled by a signal F delivered by an electronic gate P which is activated when it receives, simultaneously a signal C', a selection signal S and a signal E.

2. A multiselector matrix comprises *m* verticals and *n* horizontals to which as many selection conductors are associated, the selection of the vertical *j* being effected by applying a signal C*j* to the associated conductor and the selection if the horizontal *k* being effected by applying a signal S*k* to the associated conductor. The matrix moreover comprises, first *m* delay conductors associated to the verticals and, on the other hand, *n* line conductors associated to the horizontals; a signal E*k* appearing on the line conductor associated *k* when any cross-point at all is closed on said horizontal.

3. The switching element located at the cross-point between vertical *j* and horizontal *k* can be closed by successively effecting the following operations;

a. Horizontal selection of the element by applying signal S*k*;

b. Vertical selection of the element by applying signal C*j*. This operation frees all the elements associated to vertical *j*.

c. Suppression of signal C*j*. For a duration *t* after said suppression, signal C'*j* controls the activation of gate P if a signal E*k* is present and the output signal F of said gate then controls the setting of the holding flip-flop in the 1 state.

d. Suppression of signal S*k*. The element to which signals $\overline{Cj}$ and $\overline{Sk}$ are now applied remains closed.

We claim:

1. An electronic switching matrix comprising a plurality of electronic cross-points at intersections of vertical and horizontal multiples, each cross-point having a monolithic structure including MOS transistors and bistable circuits, the gating electrode of each of said transistors being connected to a first output of said bistable circuit at the associated cross-point, means for setting said bistable circuit to the second of said bistable conditions responsive to a vertical reset signal, and means for setting said bistable to the first of said bistable conditions responsive to a gate controlled by horizontal and vertical signals, said cross-point closing responsive thereto, and means for applying the signals in the following order: a horizontal selection signal, a vertical reset signal, and a gate control signal whereby, a matrix horizontal is selected first, all selected vertical bistable circuits are then reset, and thereafter the selected cross-point is operated.

2. An electronic switching matrix comprising a plurality of electronic cross-points at intersections of intersecting multiples, each cross-point including at least one MOS transistor and a bistable circuit, the gating electrode of each of said transistors being connected to a first output of said bistable circuit at the same cross-point, means for setting said bistable circuit to the second of said bistable conditions responsive to a reset signal from a first of said multiples, and means for setting said bistable circuit to the first of said bistable conditions responsive to a gate controlled by signals from both said multiples, said cross-point closing responsive thereto, and means for applying the signals in the following order: selection signal, reset signal, and a gate control signal, whereby a matrix horizontal is selected first, all selected vertical bistable circuits are then reset, and thereafter the selected cross-point is operated.

3. An electronic switching matrix comprising a plurality of electronic cross-points at intersections of intersecting multiples, each cross-point including at least one MOS transistor and a bistable circuit, the gating electrode of each of said transistors being connected to the output of said bistable circuit at the same cross-point, means for setting said bistable circuits to the second of said bistable conditions responsive to a reset signal from a first of said multiples, and means for setting said bistable circuit to the first of said bistable conditions responsive to a gate controlled by signals from both said multiples to close said cross-point responsive thereto, and means for applying the signals in the following order: selection signal over a selected one of said second multiples, reset signal over the first multiple, and a gate control signal indicating reset of the cross-points connected to said multiple.

* * * * *